Figure 1:
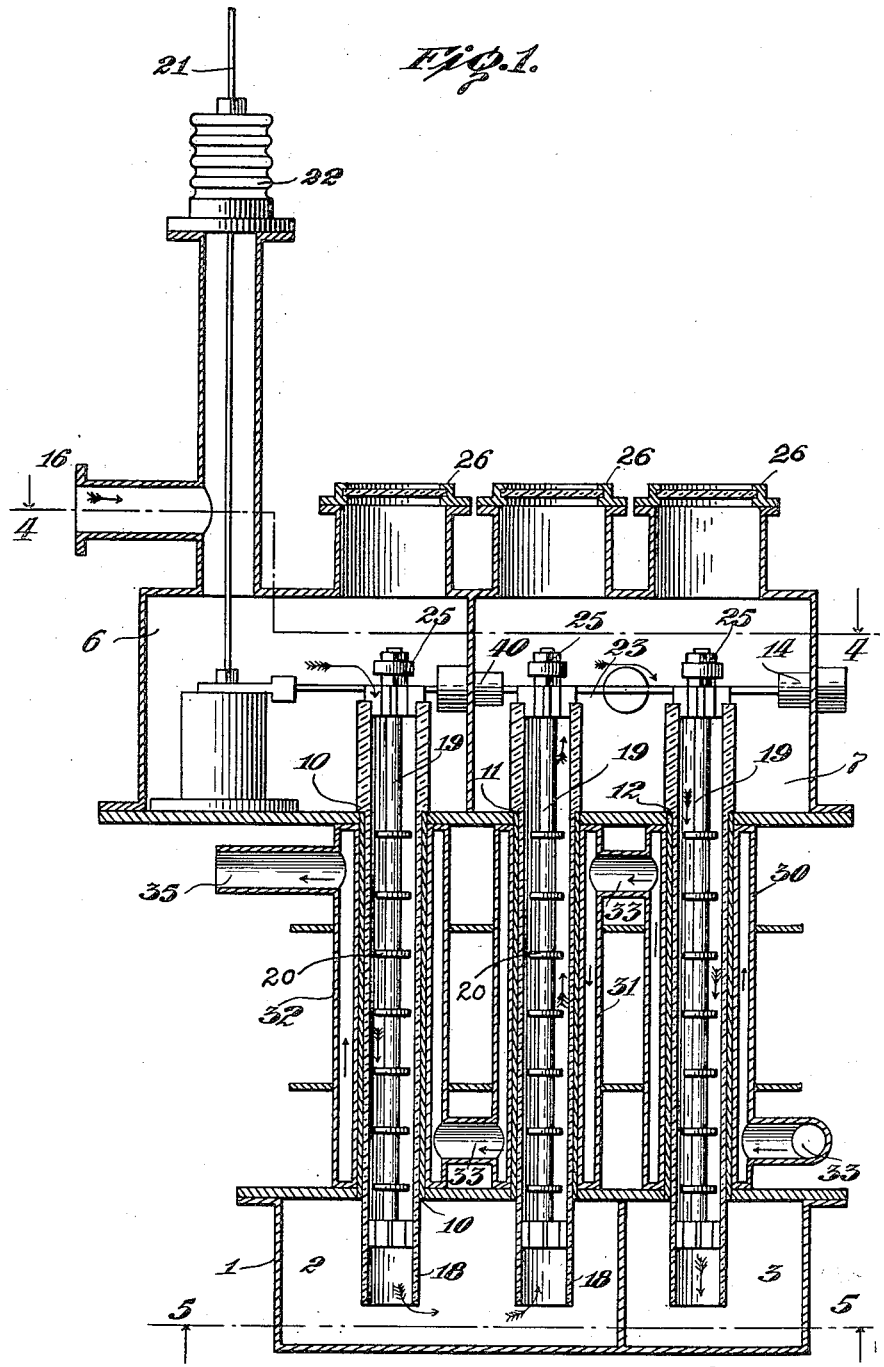

J. STEYNIS.
APPARATUS AND METHOD FOR THE PRODUCTION OF OZONE.
APPLICATION FILED JAN. 20, 1912.

1,066,674.

Patented July 8, 1913.

3 SHEETS—SHEET 1.

J. STEYNIS.
APPARATUS AND METHOD FOR THE PRODUCTION OF OZONE.
APPLICATION FILED JAN. 20, 1912.

1,066,674.

Patented July 8, 1913.
3 SHEETS—SHEET 2.

Witnesses:
C. S. Ashley
F. T. Donohue

Inventor
Jan Steynis
By his Attorneys
Sheffield, Bentley & Betts

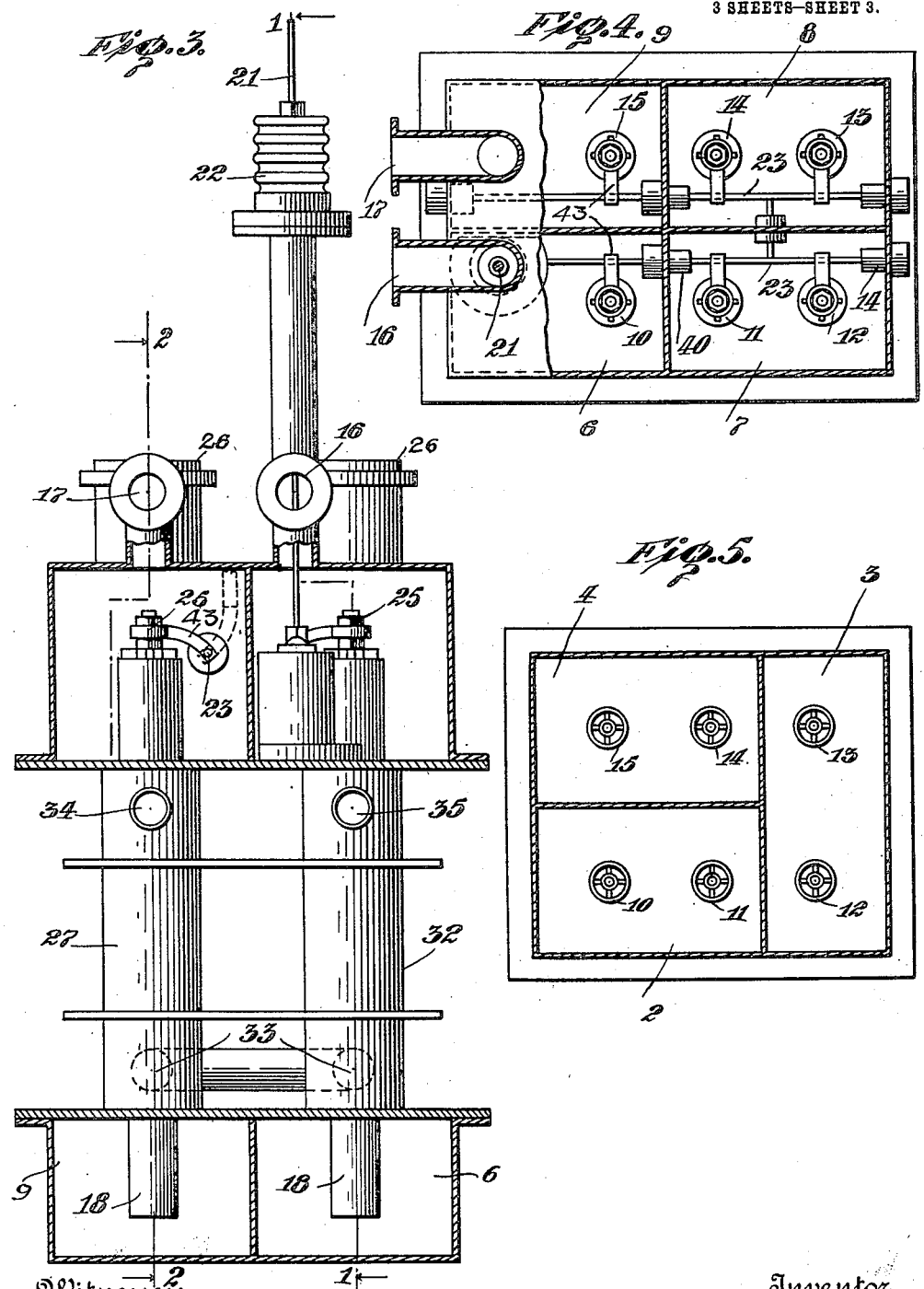

UNITED STATES PATENT OFFICE.

JAN STEYNIS, OF NEW YORK, N. Y., ASSIGNOR TO STEYNIS OZONE COMPANY, A CORPORATION OF NEW YORK.

APPARATUS AND METHOD FOR THE PRODUCTION OF OZONE.

1,066,674.  Specification of Letters Patent.  Patented July 8, 1913.

Application filed January 20, 1912.  Serial No. 672,314.

*To all whom it may concern:*

Be it known that I, JAN STEYNIS, a subject of the Queen of the Netherlands, residing in the city, county, and State of New York, have invented certain new and useful Improvements in Apparatus and Methods for the Production of Ozone, of which the following is a full, clear, and complete disclosure.

My invention relates to apparatus and methods for producing ozone of the general kind described in my Patents Nos. 906,081 and 906,468.

The objects of my invention are to provide apparatus for producing ozone which will be more reliable in operation than apparatus heretofore used, which will be compact and durable and which when used in practising my improved method forming a part of this invention, will give an increased efficiency and a higher concentration than has heretofore been obtained.

Other objects and advantages will be pointed out in connection with the description of the invention.

In the drawing accompanying and forming a part of this specification, I have illustrated one embodiment of my improved apparatus.

Figure 2:
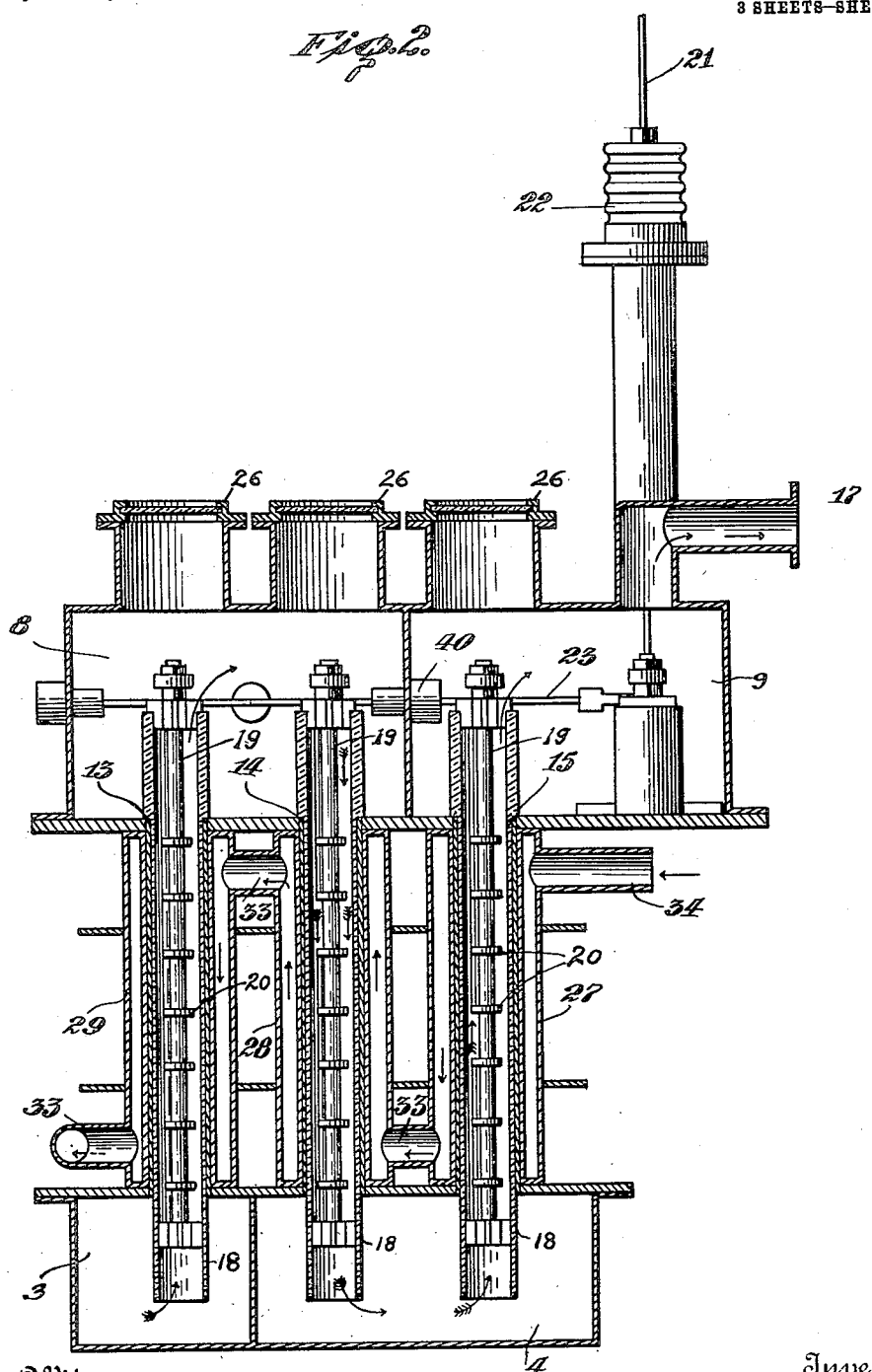

Figure 1 of the drawing is a sectional view of the apparatus taken on line 1—1 of the apparatus as shown in Fig. 3. Fig. 2 is a similar sectional view taken on the line 2—2 of Fig. 3 facing the other side of the apparatus from Fig. 1. Fig. 3 is an end elevation of the apparatus shown in Figs. 1 and 2, the end walls of the upper and lower compartments being broken away. Fig. 4 is a sectional view taken on the line 3—3 of Fig. 1. Fig. 5 is a sectional view taken on line 4—4 of Fig. 1.

Referring in detail to the mechanism shown in these figures, the numeral 1 designates a lower casing forming the base of the apparatus, which casing is divided into three compartments 2, 3 and 4 (see Fig. 5).

The numeral 5 designates an upper casing which is divided into four compartments 6, 7, 8 and 9 (see Fig. 4).

Hollow electrodes 10, 11, 12, 13, 14 and 15 arranged in two parallel rows open at their upper ends into the compartments 6, 7, 8 and 9 and at their lower ends into the compartments 2, 3 and 4 and the compartments serve to connect these hollow electrodes in series with one another. The hollow electrodes each contain a dielectric tube 18 and each dielectric tube contains and supports an elongated inner electrode 19 having discharge rings 20 spaced thereon. The discharges take place between the rings 20 and the hollow electrodes through the dielectric. The inner electrodes 19 are slidably mounted in the dielectric tubes so that in case they are damaged they can be readily removed through the windows 26. At their lower ends the dielectric tubes extend a considerable distance below the lower ends of the electrodes and this is a desirable feature since it prevents the formation of arcs between the lower ends of the inner electrodes and the grounded casing.

The numeral 16 designates the air intake, which is arranged to deliver air suitably cooled and dried into the compartment 6, from which compartment it passes down the electrode 10 into the lower compartment 2, then up through the electrode 11 into the compartment 7, then down electrode 12 into compartment 3, then up electrode 13 into compartment 8, then down electrode 14 into compartment 4, and then up electrode 15 and out of the machine at the opening 17. The flow of air through the apparatus is indicated in Figs. 1 and 2 by feathered arrows. The hollow electrodes are surrounded by cooling jackets 27, 28, 29, 30, 31 and 32 and these are connected in series with one another by conduits 33.

The numeral 34 designates the intake for the cooling medium, which, because of the series arrangement of the cooling jackets is caused to pass through the jackets 27, 28, 29, 30, 31 and 32 in the order named and out of the machine at the opening 35. The course of the cooling medium through the jackets and the conduits connecting them is indicated by unfeathered arrows. It will thus be seen that the cooling medium moves along the hollow electrodes in a direction always opposite that of the air passing through the electrodes.

Current for producing the discharges is supplied to the inner electrodes in the following manner. A conductor 21 enters the machine through the insulator 22 and its lower end is connected to the horizontal conductors 23, which extend into the several compartments and are disposed adjacent the tops of the inner electrodes. The horizontal conductors pass through and are insulated from the walls of the compartments by insulators 40. Connections 43 pivoted to the horizontal conductors 23 convey the current to the inner electrodes 19. These connections may be swung back as shown in Fig. 3, so as to permit the removal of electrodes 19.

The air forced into the machine through opening 16 while passing successively through the several electrodes is subjected alternately to electrical discharges from the rings 20 and to the cooling action of the cooling medium in the jackets. Since the air and cooling medium flow in opposite directions throughout their courses, the temperature of the air may be maintained substantially constant and this is important because any rise in temperature of the air while undergoing treatment would result in the destruction of some of the ozone previously generated. By arranging the hollow electrodes in series, I insure a uniform flow through all the electrodes which is not possible where the tubes are arranged in parallel.

With a machine of the kind above described I have obtained a concentration of 7.26 grams of ozone per cubic meter of air treated, with an efficiency of 227 grams of ozone per kilowatt hour of current used. I have also obtained a concentration of 9.52 grams of ozone per cubic meter of air treated, with an efficiency of 171 grams of ozone per kilowatt of current consumed. These tests were made at an average temperature of 28 Fahrenheit. The difference in these results is due to the difference of flow of the air while passing through the machine. In the latter case the air was made to flow more slowly than in the first. The values of concentration and efficiency in the above cases, I believe, are considerably higher than have heretofore been obtainable with the old methods and apparatus.

In practising my improved method and in operating the apparatus above described I preferably employ liquefied ammonia as a cooling medium and the apparatus shown is preferably inclosed in a heat insulating case in order that a low temperature may be maintained.

The apparatus herein described has some features in common with but is an improvement on the apparatus described in my pending application Serial No. 603,276, from which it is differentiated by the series arrangement of the cooling and ozonizing tubes and by the replacing of the contact plates in the lower compartment of the apparatus of the earlier application by the conductors and pivoted contacts all in the upper compartments. By employing conductors located in the upper casing 5, I am able to extend the dielectric tubes a substantial distance below the lower end of the electrodes, which is desirable for the reasons above pointed out.

The method herein described is an improvement on the method described in my Patent No. 906,468 in that while embodying the idea of alternately ozonizing and cooling the air, it adds the additional feature of causing the air to pass through tubes arranged in series and the cooling medium to move in contact with the tubes but always in an opposite direction.

While I have described one embodiment of my apparatus and the preferred way of practising my method, still I am aware that these may be varied by those skilled in the art without departing from the scope of my claims.

What I claim is:

1. The method of generating ozone which consists in progressively subjecting air to a series of electrical discharges while moving in one direction and in simultaneously cooling the air and resultant ozone by subjecting it to the action of a cooling fluid moving in the opposite direction, substantially as described.

2. In an apparatus of the kind described, two sets of compartments, a plurality of hollow electrodes, one end of each electrode connected to a compartment of each set, whereby all of the compartments of one set are connected through the hollow electrodes with all of the compartments of the other set for the purpose of passing air to be ozonized therethrough, substantially as described.

3. In an apparatus of the kind described, oppositely disposed casings each divided into separate compartments, a plurality of hollow electrodes connecting the compartments of one casing with the compartments of the other casing and arranged in series with each other for the purpose of passing air to be ozonized therethrough, substantially as described.

4. In an apparatus of the kind described, a lower and an upper compartment, hollow electrodes connecting the lower and upper compartments and arranged in series, inner electrodes in the hollow electrodes and separated therefrom by dielectric tubes which extend below both electrodes, substantially as described.

5. In an apparatus of the kind described, two sets of compartments, hollow electrodes connecting the compartments of one set with those of the other, and arranged in series, inner electrodes in the hollow electrodes and separated therefrom by dielectric tubes which extend below both electrodes, distributing bars disposed adjacent the ends of the electrodes and pivoted connections extending from the bars to the ends of the inner electrodes, substantially as described.

JAN STEYNIS.

Witnesses:
   WALTER S. JONES,
   R. M. RICKETTS.